(12) United States Patent
Hutton et al.

(10) Patent No.: US 8,563,759 B2
(45) Date of Patent: Oct. 22, 2013

(54) PROCESS FOR EXTRACTING LIPIDS FROM MICROALGAE

(75) Inventors: Matthew W Hutton, Burke, VA (US); Corinne R Lehr, Atascadero, CA (US)

(73) Assignee: Cal Poly Corporation, San Luis Obispo, CA (US)

( * ) Notice: Subject to any disclaimer, the term of this patent is extended or adjusted under 35 U.S.C. 154(b) by 248 days.

(21) Appl. No.: 12/896,863

(22) Filed: Oct. 2, 2010

(65) Prior Publication Data

US 2012/0083617 A1   Apr. 5, 2012

(51) Int. Cl.
*C11B 1/10* (2006.01)
*C11C 3/00* (2006.01)
*B01D 11/00* (2006.01)

(52) U.S. Cl.
USPC ............... 554/8; 554/169; 554/175; 554/193; 554/206; 554/224; 210/634; 210/633; 210/702; 210/749; 210/768; 210/806

(58) Field of Classification Search
None
See application file for complete search history.

(56) References Cited

U.S. PATENT DOCUMENTS

| | | | |
|---|---|---|---|
| 2,484,831 A | 10/1949 | Hutchins et al. | |
| 3,755,385 A * | 8/1973 | Hutchins, J.P. | 554/167 |
| 3,878,232 A | 4/1975 | Hayes et al. | |
| 3,998,800 A | 12/1976 | Youngquist | |
| 4,255,261 A | 3/1981 | Dodd | |
| 4,298,540 A | 11/1981 | Youn et al. | |
| 4,341,038 A | 7/1982 | Bloch et al. | |
| 4,714,571 A | 12/1987 | Tremblay et al. | |
| 4,792,418 A | 12/1988 | Rubin et al. | |
| 4,851,339 A | 7/1989 | Hills | |
| 5,378,369 A | 1/1995 | Rose et al. | |
| 5,539,133 A | 7/1996 | Kohn et al. | |
| 5,688,528 A | 11/1997 | Carlsson et al. | |
| 5,707,673 A | 1/1998 | Prevost et al. | |
| 5,942,597 A | 8/1999 | Noda et al. | |
| 6,350,890 B1 | 2/2002 | Kiy et al. | |
| 6,399,803 B1 | 6/2002 | Corley et al. | |
| 6,524,486 B2 | 2/2003 | Borodyanski et al. | |
| 2007/0048848 A1 | 3/2007 | Sears | |
| 2007/0048859 A1 | 3/2007 | Sears | |
| 2008/0009055 A1 | 1/2008 | Lewnard | |
| 2010/0151540 A1 | 6/2010 | Gordon et al. | |
| 2010/0233761 A1 | 9/2010 | Czartoski et al. | |

FOREIGN PATENT DOCUMENTS

WO   WO 2010042842 A2   4/2010

OTHER PUBLICATIONS

Guiry, M.D., *Monoraphidium minutum*, 1996-2012, Algaebase, (abs. 2 pages).*

(Continued)

*Primary Examiner* — Yate K Cutliff
(74) *Attorney, Agent, or Firm* — Knobbe Martens Olson & Bear LLP

(57) ABSTRACT

A process for extracting lipids from microalgae; the process involves pretreating a quantity of non-homogenized microalgae with an aliphatic alcohol for a predetermined period of time. The pretreatment liberates a substantial portion of lipids from the microalgae without requiring energy intensive cell membrane disruptive technologies. The liberated lipids are then treated with a transesterification reagent to form fatty acid methyl esters. The fatty acid methyl esters are separated from the resulting mixture and may be further purified to remove remaining solvents or other impurities. The fatty acid methyl esters produced by the process are suitable as a green energy biodiesel product.

17 Claims, 3 Drawing Sheets

(56) References Cited

OTHER PUBLICATIONS

Belarbi, E.H., et al., A process for high yield and scalable recovery of high purity eicosapentaenoic acid esters form microalgae ad fish oil, 2000, Enzyme and microbial technology, vol. 26, pp. 516-529.*
Fajardo, A.R., et al., Lipid extraction from themicroalga *Phaeodactylum tricornutum*, 2007, Eur. J. Lipid Sci. Technol., vol. 109, pp. 120-126.*
Gerpen, J.V., Biodiesel processing and production, 2005, Fuel Processing Technology, vol. 86, pp. 1097-1107.*
Kim, J.T. et al., Occurrence of *Dictyosphaerium pulchellum* (*Chlorophyceae*) Bloom in a Small Pond, 2001, Korean J. Limnol, 34(4), pp. 292-297.*
Medina, A. R, et al., Downstream processing of algal polyunsaturated fatty acids, 1998, Biotechology Advances, vol. 16, No. 3, pp. 517-580.*
Piorrek, M., Baasch, K.-H., & Pohl, P. (1984). Biomass Production, Total Protein, Chlorophylls, Lipids and Fatty Acids of Freshwater Green and Blue-Green Algae Under Different Nitrogen Conditions. Phytochemistry, 207-216.
Raemy, B. (2008). Scientific Challenges to Developing Marine Algal Biofuels—A View from the Field. Algal Commercialization Seminar—A UCSD initiative for Algal and Cyanobacterial Commercialization. San Diego, pp . 1-33 (33 pages).
Raymond, L. P. (1983). Aquatic Biomass as a Source of Fuels and Chemicals. Golden: Solar Energy Research Institute, (10 pages).
Rodolfi, L., Zittelli, G. C., Bassi, N., Padovani, G., Biondi, N., Bonini, G., et al. (2008). Microalgae for Oil: Strain Selection, Induction of Lipid Synthesis and Outdoor Mass Cultivation in a Low-Cost Photobioreactor. Biotechnology and Bioengineering, 100-112.
Sikkema, J., Bont, J. A., & Poolman, B. (1995). Mechanisms of Membrane Toxicity of Hydrocarbons. Microbiological Reviews, 201-222.
Sterner, R. W., & Grover, J. P. (1998). Algal growth in warm temperature reservoirs: kinetic examination of nitrogen, temperature, light and other nutrients. Water Research, 3539-3548.
Tapanes, N. C., Aranda, D. A., Carneiro, J. W., & Antunes, O. A. (2007). Transesterification of *Jatropha curcas* oil glycerides: Theoretical and experimental studies of biodiesel reaction. Fuel, 2286-2295.
Tedesco, M. A., & Duerr, E. O. (1989). Light, temperature and nitrogen starvation effects on the total lipid and fatty acid content and composition of *Spirulina platensis* UTEX 1928. Journal of Applied Phycology, 201-209.
Tredici, M. R., & Zittelli, G. C. (1998). Efficiency of Sunlight Utilization: Tubular Versus Flat Photobioreactors. Biotechnology and Bioengineering, 187-197.
U.S. Department of Energy. (2009). National Algal Biofuels Technology Roadmap. Washington, D.C.: U.S. Department of Energy, (709 pages).
Energy Information Administration. (2009). Renewable Energy Annual 2007. Washington, D.C.: United States Department of Energy, (137 pages).
Vandanjon, L., Rossignol, N., Jaouen, P., Robert, J. M., & Quemeneur, F. (1999). Effects of Shear on Two Microalgae Species. Contribution of Pumps and Valves in Tangential Flow Filtration Systems. Biotechnology and Bioengineering, 1-9.
Volmer, M., Meiborg, G., & Muskiet, F. A. (1988). Simultaneous capillary gas chromatographic profiling of medium- and long-chain fatty acid methyl esters with split injection. Journal of Chromatography, 385-394.
Woertz, I. (2007). Lipid Productivity of Algae Grown on Dairy Wastewater as a Possible Feedstock for Biodiesel. San Luis Obispo: Cal Poly. (87 pages).
Woertz, I., Feffer, A., Lundquist, T., & Nelson, Y. (2009). Algae Grown on Dairy and Municipal Wastewater for Simultaneous Nutrient Removal and Lipid Production for Biofuel Feedstock. Journal of Environmental Engineering, 1115-1122.
Zhu, L., Zong, M., & H.Wu. (2008). Efficient lipid production with *Trichosporon fermentans* and its use for biodiesel preparation. Bioresource Technology, 7881-7885.
Lipid Extraction of Tissues with a Low-Toxicity Solvent, Hara Atsushi, Radin S. Norman, Analytical BioChemisty 90, 420-426 (1978).
Methylation of Fatty Acids—A Beginner's Guide, Christie, Scottish Crop Research Institute (and Mylnefield Research Services Lipid Analysis Unit), Invergowrie, Dundee (DD2 5DA), Scotland Last updated: Mar. 9, 2007.
An Outlook on Microalgal Biofuels, Wijffels,Rene H., Barbosa, Maria, Science 329, Aug. 13, 2010 796-799.
Water Permeability of Polyunsaturated Lipid Membranes Measured by 170 NMR,Daniel Huster, Albert J. Jin, Klaus Arnold and Klaus Gawrisch, Biophysical Journal vol. 73 Aug. 1997 855-864.
Extraction and Characterization of Lipids From Microalgae Grown on Municipal Wastewater, Matthew W. Hutton, Dec. 2009, A Master's Thesis Presented to the Faculty of California Polytechnic State University San Luis Obispo, In partial fulfillment of the Requirements for the Degree of Master of Science in Civil and Environmental Engineering.
Andrich, G., Nesti, U., Venturi, F., Zinnai, A., & Fiorentini, R. (2005). Supercritical fluid extraction of bioactive lipids from the microalga *Nannochloropsis* sp. European Journal of Lipid Science and Technology, pp. 381-386.
Bannon, C. D., Craske, J. D., Felder, D. L., Garland, I. J., & Norman, L. M. (1987). Analysis of fatty acid methyl esters with high accuracy and reliability. Journal of Chromatography, 231-241.
Belay, A. pers. comm. (Oct. 2009). San Diego, California: Earthrise Nutritionals, LLC.
Benemann, J. R. (2008). Open Ponds and Closed Photobioreactors—Comparative Economics. 5th Annual World Congress on Industrial Biotechnology & Bioprocessing. Chicago.
Benemann, J. R. (2008). Overview: Algae to Biofuels. NREL-AFOSR Workshop, Algal Oil for Jet Fuel Production. Arlington.
Benemann, J., Koopman, B., Weissman, J., Eisenberg, D., & Goebel, R. (1980). Development of Microalgae Harvesting and High-Rate Pond Technologies in California. Algae Biomass, 457-495.
Bligh, E., & Dyer, W. (1959). A Rapid Method for Total Lipid Extraction and Purification. Canadian Journal of Biochemistry and Physiology, 911-917. Chaplin, M. (Dec. 20, 2004). London South Bank University. Retrieved Jul. 9, 2009, from Ultrasonic cell disruption: http://www.lsbu.ac.uk/biology/enztech/ultrasonic.html.
Chaumont, D. (1993). Biotechnology of algal biomass production: a review of systems for outdoor mass culture. Journal of Applied Phycology, 593-604.
Chisti, Y. (2007). Biodiesel from microalgae. Biotechnology Advances, 294-306.
Energy Information Administration. (2007). Annual Energy Outlook 2007. Washington, D.C: United States Department of Energy, (243 pages).
Haas, M. J. (2005). Improving the economics of biodiesel production through the use of low value lipids as feedstocks: vegetable oil soapstock. Fuel Processing Technology, 1087-1096.
Hara, A., & Radin, N. S. (1978). Lipid Extraction of Tissues with a Low Toxicity Solvent. Analytical Biochemistry, 420-426.
Hayakawa, K., Tsujimura, S., Napolitano, G. E., Nakano, S.-i., Kumagai, M., Nakajima, T., et al. (2002). Fatty acid composition as an indicator of physiological condition of the cyanobacterium *Microcystis aeruginosa*. Limnology, 29-35.
Hejazi, M. A. (2004). Milking of Microalgae: Production and selective extraction of β-carotene in two-phase bioreactors. Wageningen: Wageningen University and Research Centre, (134 pages).
Henriques, M., Silva, A., & Rocha, J. (2007). Extraction and quantification of pigments from a marine microalga: a simple and reproducible method. In A. Mendez-Vilas, Communicating Current Research and Educational Topics and Trends in Applied Microbiolog; vol. 2 (pp. 586-593). Badajoz: Formatex.
Hu, Q., Sommerfeld, M., Jarvis, E., Ghirardi, M., Posewitz, M., Seibert, M., et al. (2008). Microalgal triacylglycerols as feedstocks for biofuel production: perspectives and advances. The Plant Journal, 632-639.

(56) References Cited

OTHER PUBLICATIONS

Joshi, J. B., Elias, C. B., & Patole, M. S. (1996). Role of hydrodynamic shear in the cultivation of animal, plant and microbial cells. The Biochemical Engineering Journal, 121-141.

Karmee, S. K., Mahesh, P., Ravi, R., & Chadha, A. (2004). Kinetic Study of the Base-Catalyzed Transesterification of Monoglycerides from Pongamia Oil. Journal of the American Oil Chemist's Society, 425-430.

Mitchell, B. G. (2009). Algae as a Biofuel Feedstock. Federal Laboratory Consortium Far West and Mid-Continent Regional Meeting. Bulingame, California: Scripps Institution of Oceanography, pp. 1-14.

Nagle, N., & Lemke, P. (1990). Production of Methyl Ester Fuel from Microalgae. Applied Biochemistry and Biotechnology, pp. 355-361.

* cited by examiner

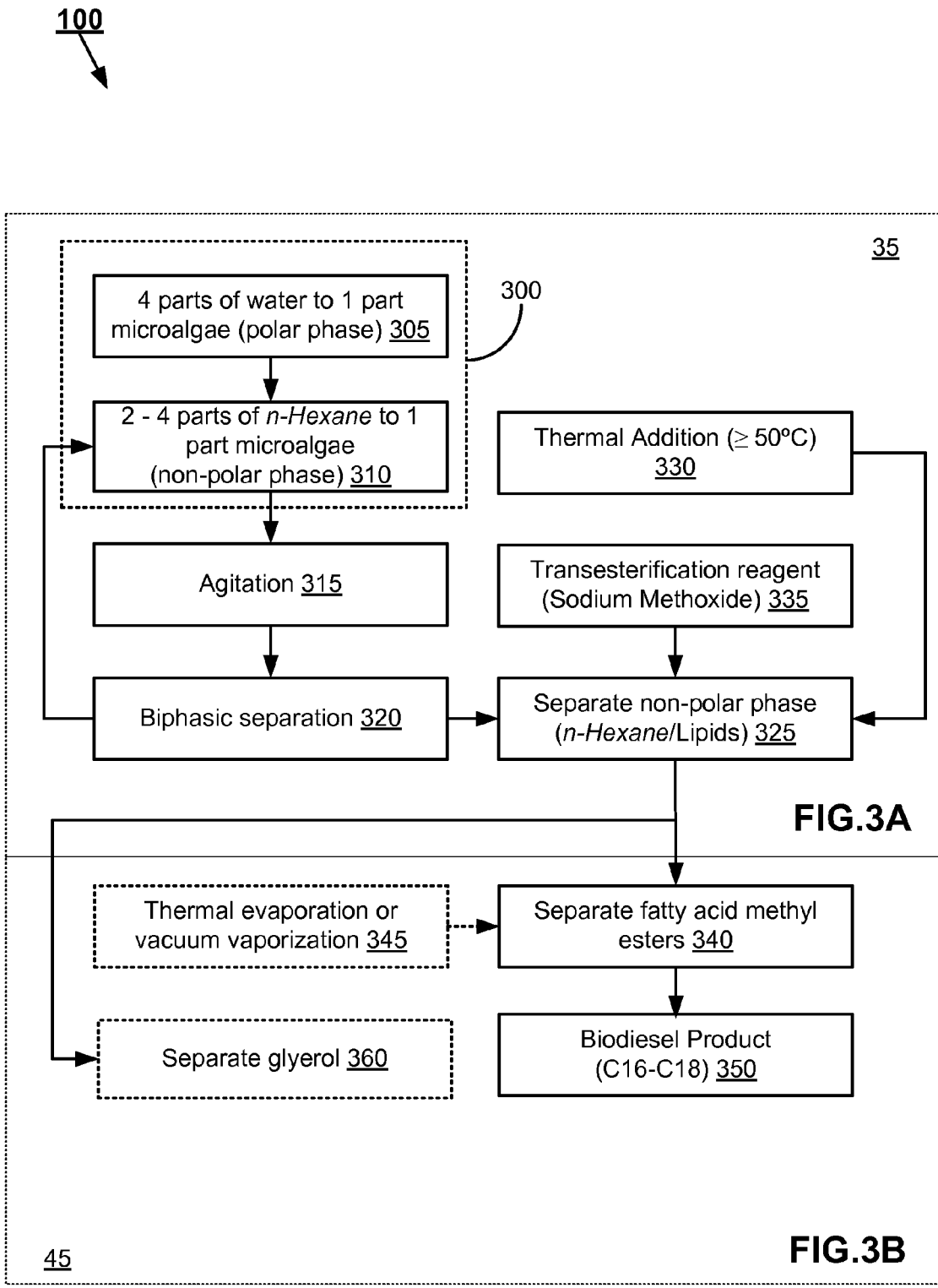

PROCESS FOR EXTRACTING LIPIDS FROM MICROALGAE

STATEMENT OF GOVERNMENT INTEREST

The U.S. Government has a paid-up license in this invention and the right in limited circumstances to require the patent owner to license others on reasonable terms as provided for by the terms of Grants N00014-07-1-1152, N00014-08-1-1

CROSS-REFERENCE TO RELATED APPLICATIONS

Not Applicable

RELEVANT FIELD

This application is directed generally toward renewable energy resources and more specifically toward extraction of lipids from microalgae.

BACKGROUND

The economic vitality of the United States is threatened by its dependency on foreign oil from which fossil fuels and other petroleum products are generated. This situation is seen as economically and politically unfavorable because it places the United States in a position of dependency and in competition with other nations over declining resources. Moreover, reliance on fossil fuels comes at severe costs to the environment both by its raw production and burning. For example, catastrophic oil spills could conceivably eliminate entire ecosystems which would devastate food chains in which the United States and other countries rely upon. In addition, carbon dioxide emissions generated by the burning of fossil fuel is considered a driving factor of worldwide global warming which could render arable lands into deserts as weather patterns change and draughts become more common worldwide.

To address the many serious issues associated with fossil fuels, biofuels are being investigated which could aid in the replacement of conventional fossil fuels and decrease the reliance of the United States on foreign oil supplies and also reduce carbon dioxide emissions by sequestering this greenhouse gas in biomass which could be used as animal feed and/or for other environmentally sound purposes. Moreover, the production of microalgae does not require high quality or large land areas like most terrestrial crops; microalgae may be grown in arid environments and many species are capable of growth in saline waters. Accordingly, to effectively utilize the microalgae as a source of biofuel, a cost-effective process for the extraction of lipid compounds is needed. The ideal extraction process would be scalable, safe, inexpensive, and have a low energy requirement. This means minimizing the number and complexity of process steps, limiting the use of hazardous materials and minimizing the material and energy consumption for the processing of the biofuels.

SUMMARY

In view of the foregoing, various exemplary process embodiments for extracting lipids from microalgae are disclosed herein. In one exemplary embodiment, a process for extracting lipids from microalgae involves pretreating a quantity of non-homogenized microalgae with an aliphatic alcohol for a predetermined time. The pretreatment liberates a substantial portion of lipids from the microalgae without requiring energy intensive cell membrane disruptive technologies. The liberated lipids are subsequently treated with a transesterification reagent to form fatty acid methyl esters. The fatty acid methyl esters are separated from the treatment process and may be further purified to remove remaining solvents and/or other impurities. The fatty acid methyl esters produced by the various processes disclosed herein are suitable as a renewable green energy biodiesel product which does not significantly increase carbon dioxide emissions.

In an exemplary embodiment, a quantity of generally non-homogenized microalgae is treated with an aliphatic alcohol for a predetermined time which liberates a substantial quantity of lipids from the microalgae. The liberated lipids are then subjected to a transesterification reagent to form fatty acid methyl esters (FAME). The FAME is then separated from the mixture and may be further purified as described above to remove remaining solvents and/or other impurities. Typically, the resulting FAME comprises a carbon backbone principally in a range of C16-C18, which is well suited for use as a biodiesel fuel.

In a preferred exemplary embodiment, the microalgae are substantially dewatered prior to pretreating with the aliphatic alcohol. This step assists in concentrating the microalgae into a sufficient compact quantity suitable to perform meaningful FAME production and also minimizes hydrolysis reactions when basic transesterification processes are utilized.

The aliphatic alcohol may utilize methanol, ethanol, propanol or butanol. In a preferred exemplary embodiment, 2-propanol is used to perform the pretreatment of the microalgae. Various forms of butanol (i.e., normal, secondary or tertiary) may also be utilized to pretreat the microalgae prior to transesterification. The aliphatic alcohol liberates a substantial fraction of available lipids from the microalgae without the need to perform energy intensive cellular membrane disruption and/or use of highly toxic chemical solvents (e.g., chloroform).

In an exemplary embodiment, separating the lipids from a mixture of microalgae and aliphatic alcohol may be accomplished using 4 parts water and 2 parts n-hexane to 1 part microalgae. The added components form biphasic layers in which polar components of the mixture of microalgae and aliphatic alcohol separate into an aqueous layer while non-polar components separate into an aliphatic n-hexane layer.

In various exemplary embodiments, the amount of time required for pretreatment of the microalgae is at least 15 minutes and may extend up to 4 hours. In a preferred embodiment contact time for pretreatment is accomplished in 1 hour.

In one exemplary embodiment, transesterification of the extracted lipids is conducted at an elevated temperature under anhydrous conditions in order to accelerate transformation of the lipids to FAME. Anhydrous conditions are advantageous in certain basic transesterification process.

BRIEF DESCRIPTION OF DRAWINGS

The features and advantages of the various exemplary embodiments will become apparent from the following detailed description when considered in conjunction with the accompanying drawings. Where possible, the same reference numerals and characters are used to denote like features, elements, components or portions of the inventive embodiments. It is intended that changes and modifications can be made to the described exemplary embodiments without departing from the true scope and spirit of the inventive embodiments described herein and as is defined by the claims.

FIG. 3A—depicts a transesterification process flow diagram for extracting lipids from microalgae in accordance with an exemplary embodiment.

FIG. 3B—depicts a third separation process flow diagram for extracting lipids from microalgae in accordance with an exemplary embodiment.

DETAILED DESCRIPTION

Various exemplary embodiments of a process for extracting lipids from microalgae are disclosed herein. In the following detailed description, numerous specific details are set forth in order to provide a thorough understanding of the present inventive embodiments. It will be apparent, however, to one skilled in the relevant art that the present inventive embodiments may be practiced without these specific details. In other instances, well-known structures, process steps, devices or components may be shown in block diagram form in order to avoid unnecessarily obscuring the present inventive embodiments.

Figure 1:
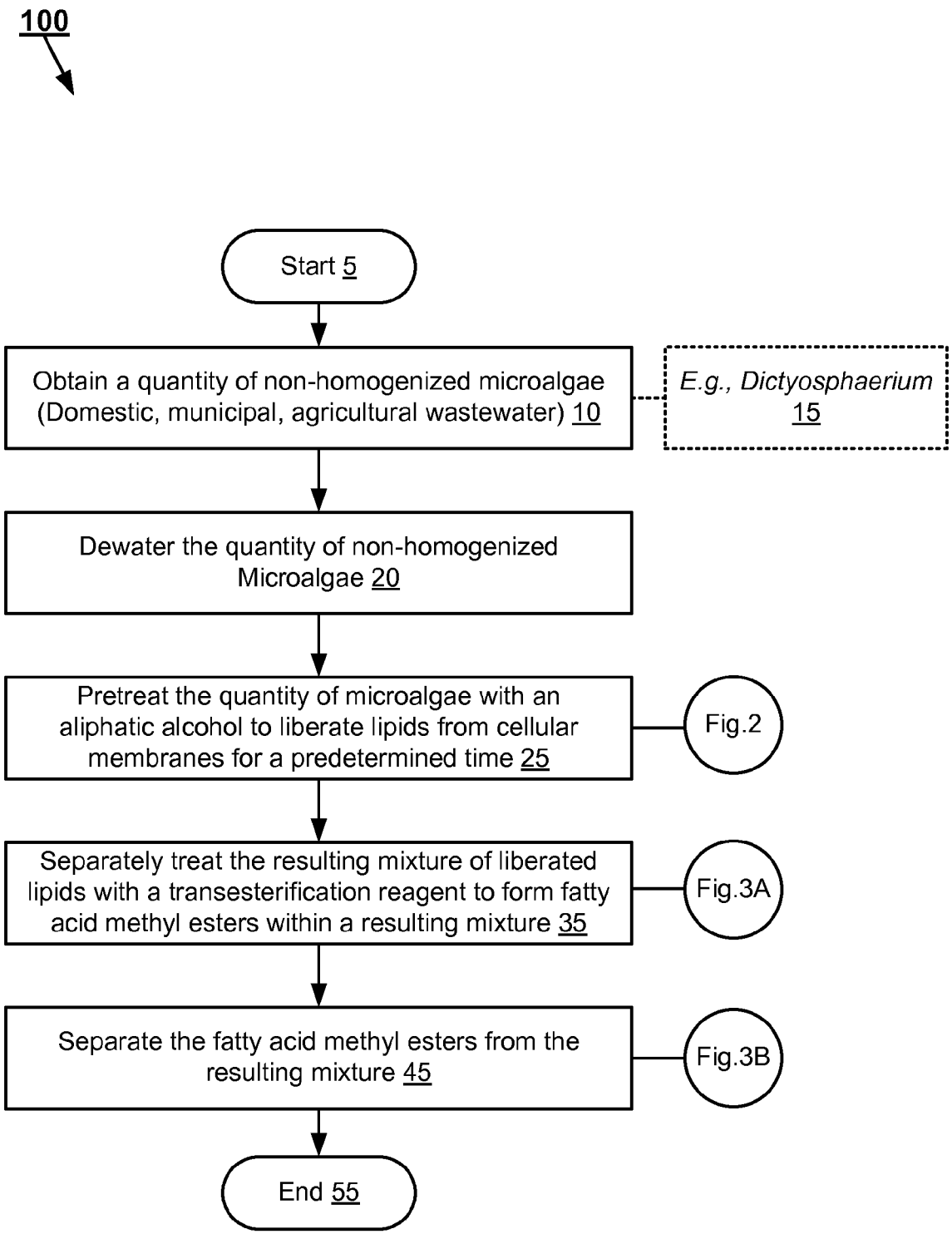
FIG. 1—depicts a general process flow diagram of a process for extracting lipids from microalgae in accordance with an exemplary embodiment.

Referring to FIG. 1, a general process flow diagram of a process 100 for extracting lipids from microalgae in accordance with an exemplary embodiment is depicted. In this exemplary embodiment, the process is initiated 5 by obtaining a quantity of microalgae 10. The microalgae may be obtained or derived from a domestic, municipal or agricultural wastewater treatment plant and separately cultured to maximize microalgae yield. For example, microalgae of the genus *Dictyosphaerium* 15 have been empirically shown to predominate over other common microalgae present in domestic wastewater, followed by *Nitzschia* and *Scenedesmus*. Other microalgae genus/species may also be used in the process. For example, PCT/US2009/060199 filed Oct. 9, 2009 to De Crecy discloses a wide range of microorganisms which may suitable for use in biofuel production. The application to De Crecy is hereby incorporated by reference as if fully set forth herein.

The harvested microalgae are then dewatered 20 in order to concentrate a sufficient volume of the microalgae to obtain an adequate product yield. Dewatering is also desirable when utilizing basic transesterification techniques. Common dewatering techniques include centrifugation, mechanical pressing, flocculation, bubble separation, heat vaporization and sun drying. Preferably, dewatering techniques should utilize a method which requires the lowest net energy input to accomplish dewatering.

Once an adequate quantity of dewatered microalgae has been obtained, the microalgae are pretreated with an aliphatic alcohol to liberate lipids from cellular membranes 25. The pretreatment may suspend the microalgae in the aliphatic alcohol to allow maximum surface area contact.

No separate pH adjustment is required for pretreatment of the microalgae. The time duration and aliphatic alcohol used in the pretreatment step is discussed in detail in the discussion accompanying FIG. 2 below.

Once a sufficient amount of time has occurred to allow the aliphatic alcohol to liberate lipids from the microalgae, the liberated lipids are separately treated with a transesterification reagent to form fatty acid methyl esters (FAME) 35. The FAME may be generated using either acidic or basic transesterification reagents known in the relevant art. Preferably, a basic transesterification reagent is used as being the more rapid and efficient of the methods known in the relevant art. A more detailed discussion of this transesterification step is provided in the discussion accompanying FIG. 3A below.

Upon completion of the transesterification process, the FAME is then separated from the resulting mixture from which it was generated 45 thus generally ending the process 55. A more detailed discussion of this separation step is provided in the discussion accompanying FIG. 3B below.

Figure 2:
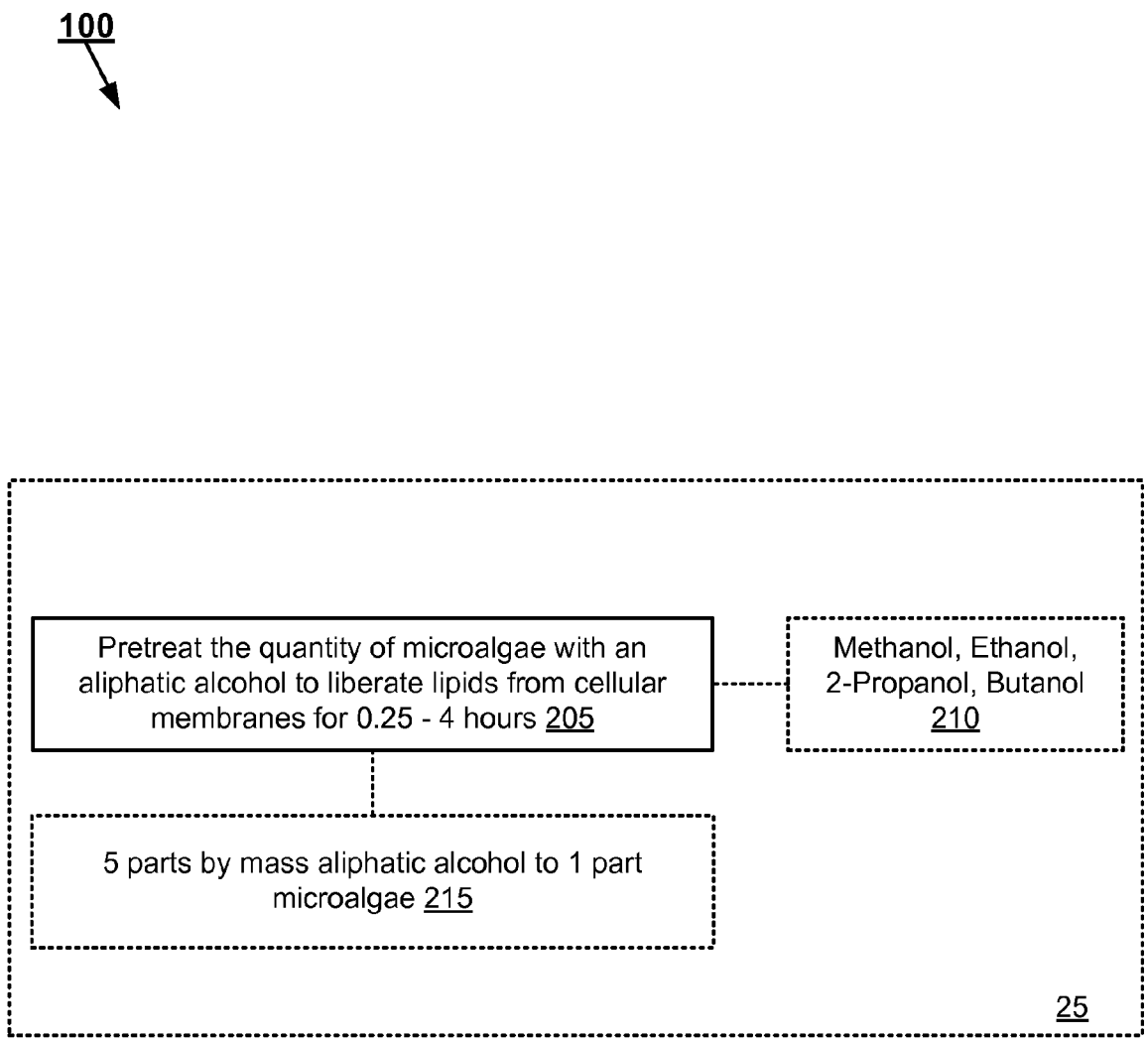
FIG. 2—depicts a pretreatment process flow diagram for extracting lipids from microalgae in accordance with an exemplary embodiment.

Referring to FIG. 2, a pretreatment process flow diagram for extracting lipids from microalgae in accordance with an exemplary embodiment is depicted. In this exemplary embodiment, the aliphatic alcohol is left in contact with the microalgae for at least 15 minutes to allow for cellular membrane penetration. The contact time may be extended to as long as 4 hours in certain cases to maximize lipid liberation from the microalgae 205. In a preferred embodiment contact time for pretreatment is accomplished in 1 hour. Variations in contact time may be necessary due to environmental conditions and/or types of microalgae undergoing pretreatment. Several different aliphatic alcohols may be used to liberate lipids from the microalgae including methanol, ethanol, propanol and butanol 210. Empirically, 2-propanol, has been shown to be superior in the liberation of lipids from the microalgae. A study was conducted by the inventors which evaluated the effectiveness of various aliphatic alcohols for liberation of lipids from microalgae. The study, entitled "Extraction and Characterization of Lipids from Microalgae Grown on Municipal Wastewater," dated December 2009, is hereby incorporated by reference in its entirety as if fully set forth herein.

Butanol was not tested for effectiveness; however, secondary and tertiary forms of butanol may also be effective in liberating lipids from the microalgae due to potentially greater lipophilic affinity for the microalgae lipids. Preferable pretreatment quantities of aliphatic alcohol are approximately 5 parts by mass of aliphatic alcohol to 1 part by mass microalgae 215.

Referring to FIG. 3A, a transesterification process flow diagram for extracting lipids from microalgae in accordance with an exemplary embodiment is depicted. In this exemplary embodiment, a biphasic solvent 300 comprised of 4 parts water to 1 part microalgae by mass 305 is added to the mixture of aliphatic alcohol, liberated lipids and microalgae. The water forms an aqueous (polar) phase of the biphasic solvent. 2 parts by mass of n-hexane to 1 part microalgae are then added to mixture of aliphatic alcohol, liberated lipids, microalgae and water. The n-hexane forms a lipophilic (non-polar) phase of the biphasic solvent 310. The entire mixture is then agitated 315 to thoroughly mix the aliphatic alcohol, liberated lipids, microalgae, water and n-hexane together. Agitation may be performed by any convenient means known in the relevant art. Aggressive and/or energy intensive agitation should not be needed.

Agitation is typically performed for 5-10 minutes to ensure thorough mixing and contact time of the biphasic solvent 300 and the remaining constituents. Biphasic separation 320 occurs once agitation is completed. The microalgae lipids being hydrophobic, transition into the non-polar layer formed from the n-hexane. Polar compounds tend to remain in the aqueous layer formed from the water. Separation of polar and non-polar constituents is fairly rapid, typically within 5-10 minutes. Once the polar and non-polar layers have been formed, the upper (non-polar) layer is separated from the remaining mixture 325. The non-polar layer contains the majority of lipids liberated from the microalgae. In one exemplary embodiment, a second addition of 2 parts by mass of n-hexane may be added to the original mixture to further extract lipids which may have become sequestered during the first separation from the non-polar layer.

The now separated non-polar phase containing n-hexane and liberated microalgae lipids is then subjected to transesterification to convert the lipids into FAME by methylation 335. In one exemplary embodiment, the transesterification reagent is sodium methoxide. The use of sodium methoxide requires an anhydrous environment to prevent deactivation of the methoxide reagent. Accordingly, a hydrophilic extraction agent, for example sodium sulfate may be added to the non-polar phase to capture any water which may have carried over during separation. The transesterification process can be accelerated by the addition of heat 330. Thermal addition may be provided to raise the temperature from ambient to at least 50° C. Depending on the capabilities of the system, the temperature of the non-polar phase undergoing transesterification may be raised to a point of reflux. Transesterification, at least using sodium methoxide, is rapid and should be completed with 15-30 minutes from the start of the transesterification reaction.

Shorter times should be expected when heat is added to the non-polar phase undergoing transesterification. Once transesterification has been completed, the remaining mixture of FAME and n-hexane may be allowed to cool. Alternately, the remaining mixture of FAME and n-hexane may be heated to at least the boiling point of n-hexane (69° C.) to remove and recover the solvent from the FAME.

Referring to FIG. 3B, a separation process flow diagram for extracting lipids from microalgae in accordance with an exemplary embodiment is depicted. In this exemplary embodiment, the FAME is separated 340 from the n-hexane and potentially other contaminates by thermal evaporation or vacuum vaporization 345. One skilled in the relevant art will appreciate that other methods may be used to purify the FAME produced by the process for extracting lipids from microalgae 100. Once purified, the FAME may be used as biodiesel product. The biodiesel product produced by the processes described herein is very similar to other biodiesel products having a long chain carbon backbone in the range of C16-C18. In addition to biodiesel production, transesterification of microalgae lipids produces significant quantities of commercially useful glycerol 360. Co-production of glycerol increases the commercial viability of the process for extracting lipids from microalgae 100.

The various exemplary inventive embodiments described herein are intended to be merely illustrative of the principles underlying the inventive concept. It is therefore contemplated that various modifications of the disclosed embodiments will without departing from the inventive spirit and scope be apparent to persons of ordinary skill in the relevant art. They are not intended to limit the various exemplary inventive embodiments to any precise form described. In particular, it is contemplated that the process for extracting lipids from microalgae may be performed using known transesterification methods not discussed herein. No specific limitation is intended to a particular sequence or aliphatic alcohol described. Other variations and inventive embodiments are possible in light of the above teachings, and it is not intended that the inventive scope be limited by this specification, but rather by the Claims following herein.

What is claimed:

1. A low energy process for extracting lipids from microalgae comprising: pretreating a quantity of generally non-homogenized microalgae with propanol for a predetermined time for liberating lipids from the microalgae; separately treating the liberated lipids with a transesterification reagent to form fatty acid methyl esters within a resulting mixture; separating the fatty acid methyl esters from the resulting mixture; wherein said process has a low energy requirement.

2. The process of claim 1 further comprising: substantially dewatering the quantity of generally non-homogenized microalgae prior to pretreating with the propanol.

3. The process of claim 1 wherein the fatty acid methyl esters have a carbon backbone principally in a range of C16-C18.

4. The process of claim 1 wherein separating the lipids from the resulting mixture comprises adding by mass: 4 parts water and 2 parts n-hexane to the resulting mixture.

5. The process of claim 1 wherein separating the lipids from the resulting mixture further comprises adding by mass: an additional 2 parts n-hexane to the resulting mixture comprises for extracting additional fatty acid methyl esters therefrom.

6. The process of claim 1 wherein the predetermined time for liberating lipids from the microalgae is at least 15 minutes.

7. A low energy process for extracting lipids from microalgae comprising: pretreating a quantity of non-homogenized microalgae with 2-propanol for 0.25 to 1 hour to liberate lipids from the microalgae to form a first mixture; separating the liberated lipids from the first mixture with a biphasic solvent; treating the separated liberated lipids with a transesterification reagent to form fatty acid methyl esters in a second mixture; separating the fatty acid methyl esters from the second mixture; wherein said process has a low energy requirement.

8. The process of claim 7 wherein the biphasic solvent comprises: n-hexane and water.

9. The process of claim 7, wherein:
  a. five parts propanol by volume relative to said microalgae are added to said algae and allowed to sit for about fifteen minutes when pretreating the quantity of non-homogenized microalgae;
  b. four parts water are added by volume relative to said microalgae is added to the first mixture;
  c. two parts hexane by volume relative to said microalgae are added to a mixture from step b. and decanted; and
  d. step c. is repeated and the decanted hexane is added to the mixture.

10. The process of claim 7 further comprising: purifying the separated fatty acid methyl esters.

11. The process of claim 7 wherein the genus of microalgae is predominately *Dictyosphaerium*.

12. The process of claim 10 wherein the transesterification reagent is sodium methoxide.

13. The process of claim 7 further comprising: substantially dewatering the microalgae prior to exposure to the 2-propanol.

14. A low energy process for extracting lipids from microalgae comprising: pretreating a quantity of non-homogenized microalgae with an effective amount of 2-propanol for a predetermined time to liberate lipids from the microalgae formed in a first mixture; separating the liberated lipids from the first mixture with a biphasic solvent, the biphasic solvent comprising effective amounts of n-hexane and deionized water; treating the separated lipids with a transesterification reagent to form fatty acid methyl esters formed in a second mixture; separating the fatty acid methyl esters from the second mixture; wherein said process has a low energy requirement.

15. The process of claim 14 further comprising purifying the separated fatty acid methyl esters from any residual biphasic solvent or 2-propanol by thermal evaporation or vacuum vaporization.

16. The process of claim 14 wherein the microalgae is derived from at least one of domestic, municipal and agricultural wastewater.

17. The process of claim 14 wherein transesterification is performed at elevated temperatures of at least 50 degrees centigrade.

* * * * *